United States Patent
Aguilar et al.

(10) Patent No.: US 9,165,292 B2
(45) Date of Patent: Oct. 20, 2015

(54) SYSTEMS AND METHODS FOR A NETWORK-TO-NETWORK INTERFACE

(71) Applicant: MasterCard International Incorporated, Purchase, NY (US)

(72) Inventors: Edgar Aguilar, Chesterfield, MO (US); Curtis S. Ruhlman, Chesterfield, MO (US); Kevin S. Carney, St. Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 287 days.

(21) Appl. No.: 13/723,659

(22) Filed: Dec. 21, 2012

(65) Prior Publication Data

US 2013/0163600 A1    Jun. 27, 2013

Related U.S. Application Data

(60) Provisional application No. 61/579,803, filed on Dec. 23, 2011.

(51) Int. Cl.
  *G06Q 20/16* (2012.01)
  *G06Q 20/02* (2012.01)
  *H04L 12/54* (2013.01)

(52) U.S. Cl.
  CPC .............. *G06Q 20/16* (2013.01); *G06Q 20/027* (2013.01); *H04L 12/54* (2013.01)

(58) Field of Classification Search
  None
  See application file for complete search history.

(56) References Cited

U.S. PATENT DOCUMENTS

| | | | |
|---|---|---|---|
| 6,226,260 | B1 | 5/2001 | McDysan |
| 6,584,083 | B1 | 6/2003 | Toporek et al. |
| 7,024,399 | B2 | 4/2006 | Sumner, II et al. |
| 7,096,281 | B2 | 8/2006 | Brabson |
| 7,239,620 | B2 | 7/2007 | Storm |
| 7,346,076 | B1 | 3/2008 | Habiby |
| 7,552,192 | B2 | 6/2009 | Carmichael |
| 7,716,312 | B2 | 5/2010 | Gamble |
| 7,881,737 | B2 | 2/2011 | Klein |
| 8,600,881 | B2 | 12/2013 | Nguyen et al. |
| 2004/0122888 | A1 | 6/2004 | Carmichael |
| 2005/0213599 | A1 | 9/2005 | Clawson |
| 2008/0049783 | A1 | 2/2008 | Habiby et al. |
| 2008/0144659 | A1 | 6/2008 | Habiby et al. |
| 2008/0267187 | A1 | 10/2008 | Kulmala et al. |
| 2009/0063334 | A1 | 3/2009 | Duncan |

(Continued)

OTHER PUBLICATIONS

PCT Search Report and Written Opinion dated Feb. 22, 2013 for Application No. PCT/US2012/071349 (10 Pages).

(Continued)

*Primary Examiner* — Diane Lo
(74) *Attorney, Agent, or Firm* — Armstrong Teasdale LLP

(57) ABSTRACT

A method and system for processing raw address data using a computer device coupled to a database are provided. The method includes receiving, at the network interface device, a first network message containing financial transaction data from a first one of a plurality of multiprotocol label switching networks, determining a destination of the financial transaction data from the network message, transmitting the financial transaction data to a second one of the plurality of multiprotocol label switching networks using a second network containing the financial transaction data, where at least one of the first one and the second one of the plurality of multiprotocol label switching networks is a satellite-based network.

18 Claims, 14 Drawing Sheets

(56) References Cited

U.S. PATENT DOCUMENTS

| | | |
|---|---|---|
| 2009/0112660 A1 | 4/2009 | Mullen et al. |
| 2009/0147690 A1 | 6/2009 | King |
| 2009/0171999 A1 | 7/2009 | McColl et al. |
| 2009/0254463 A1 | 10/2009 | Tomchek et al. |
| 2010/0014441 A1 | 1/2010 | Middleton-Hand et al. |
| 2010/0121701 A1* | 5/2010 | Nguyen et al. .............. 705/14.38 |
| 2010/0228683 A1 | 9/2010 | Ansley et al. |
| 2010/0235275 A1 | 9/2010 | Ansley |
| 2010/0254265 A1 | 10/2010 | Kempe |
| 2011/0060846 A1 | 3/2011 | Waldrop et al. |

OTHER PUBLICATIONS

PCT Search Report and Written Opinion Transmittal dated Mar. 8, 2013 and Mar. 11, 2013 for Application No. PCT/US2012/071293 (9 Pages).

* cited by examiner

SYSTEMS AND METHODS FOR A NETWORK-TO-NETWORK INTERFACE

CROSS REFERENCE TO RELATED APPLICATIONS

This application claims the benefit of U.S. Provisional Patent Application No. 61/579,803 filed Dec. 23, 2011, which is hereby incorporated by reference in its entirety.

BACKGROUND OF THE INVENTION

The field of the invention relates generally to methods and systems for network communications and, more particularly, to methods and systems for routing communications through parallel networks using network performance metrics.

Known payment card interchange networks rely primarily on terrestrial network segments to pass data between network endpoints. For example, a known network may include copper wire lines, fiber optic lines, microwave relays, and the like. Such physical infrastructures are susceptible to installation delays and network failures, especially in areas or regions where such physical infrastructure is lacking. Accordingly, systems and methods are desired which enable terrestrial networks to be extended quickly and to be made more reliable via a non-terrestrial-based backup network and intelligent routing.

BRIEF DESCRIPTION OF THE INVENTION

In one aspect, a multiple network bridge system includes a first network device that is coupled to a first service provider network, a second network device that is coupled to a second service provider network, a third network device that facilitates communication between the first network and the second network, and a fourth network device that is coupled to a satellite network, wherein the fourth network device is coupled to said third network device such that said fourth network device is capable of communicating with said first and second network devices.

In another aspect, a computer system for computer-based method for providing a payment network via a plurality of multiprotocol label switching networks wherein the method is implemented using a network interface device including a processor coupled to a memory device. The method includes receiving, at the network interface device, a first network message containing financial transaction data from a first one of a plurality of multiprotocol label switching networks, determining a destination of the financial transaction data from the network message, transmitting the financial transaction data to a second one of the plurality of multiprotocol label switching networks using a second network containing the financial transaction data, where at least one of the first one and the second one of the plurality of multiprotocol label switching networks is a satellite-based network.

In yet another aspect, one or more non-transitory computer-readable storage media has computer-executable instructions embodied thereon, wherein when executed by at least one processor, the computer-executable instructions cause the processor to receive a first network message containing financial transaction data from a first one of a plurality of multiprotocol label switching networks, determine a destination of the financial transaction data from the network message, transmit the financial transaction data to a second one of the plurality of multiprotocol label switching networks using a second network containing the financial transaction data, where at least one of the first one and the second one of the plurality of multiprotocol label switching networks is a satellite-based network.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary system including a plurality of computer devices in accordance with one example embodiment of the present invention.

FIG. 3 is an expanded block diagram of an exemplary embodiment of a server architecture of the system including the plurality of computer devices in accordance with one example embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIG. 6 is a schematic diagram of an exemplary network that may be used with the multi-party transaction card industry system shown in FIG. 1.

FIGS. 7 and 8 are schematic diagrams of an exemplary customer network that may be used with the network shown in FIG. 6.

FIGS. 9 and 10 are schematic diagrams of an exemplary NNI that may be used with the network shown in FIG. 6.

FIG. 11 is a schematic diagram of an exemplary configuration of the network shown in FIG. 6.

FIG. 12 is an alternative schematic diagram of the exemplary NNI that may be used with the network shown in FIG. 6.

FIG. 13 is a flow diagram of a computer-based method for providing a payment network via a plurality of multiprotocol label switching networks.

FIG. 14 is an expanded schematic block diagram of the payment card interchange network shown in FIG. 1 and in accordance with an exemplary embodiment of the present disclosure.

DETAILED DESCRIPTION OF THE INVENTION

Figure 1:
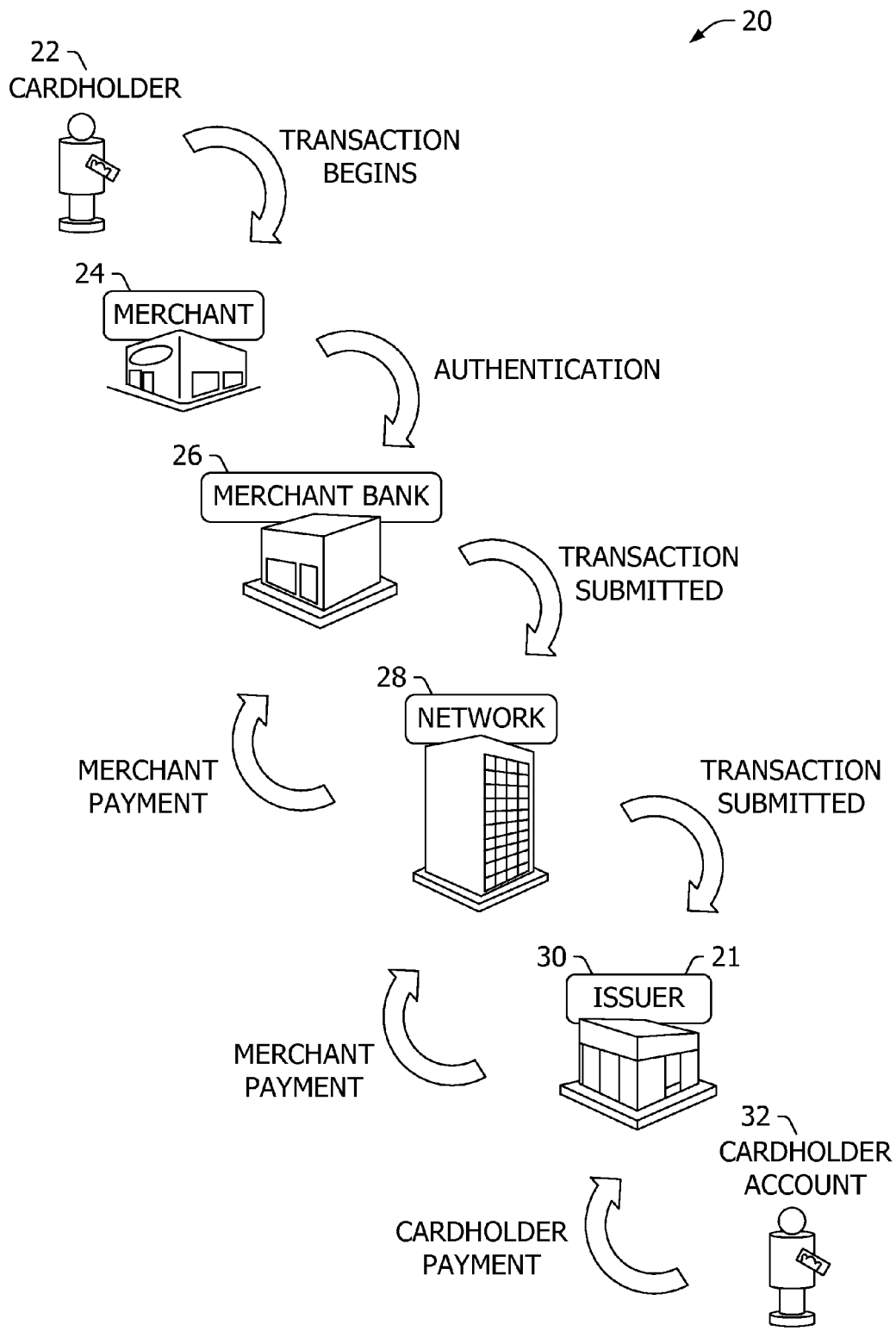
FIGS. 1-14 show exemplary embodiments of the methods and systems described herein.

Embodiments of the present invention provide methods and systems for routing communications through parallel networks using network performance metrics. Existing payment card interchange networks rely primarily on terrestrial networks to connect network endpoints. Network-to network interfaces (NNI) may be used to facilitate extending such existing networks using a satellite network or other network. The satellite network or other network may be used as a primary link or as a secondary, or backup link. As described in more detail herein, a system and method is provided for using a satellite link as a primary link until a new terrestrial network segment can be established, at which time the satellite link may become a backup link to the terrestrial circuit. Moreover, such NNI may include Quality of Service (QoS) settings that permit intelligent routing of communications between endpoints.

The NNI is a network device configured to facilitate communications between a plurality of networks such as multiprotocol label switching networks and a satellite-based network providing an interface between MPLS networks, providing regional summary to drive local transactions to regional NNIs to reduce latency for real-time transactions, provide customers with redundant access connected to regional NNIs to also reduce latency for real-time transactions, determining application type and setting QoS for the provider MPLS networks, and verifying ownership of the transaction or network packet.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a financial transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical financial transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, payment card interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/ or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When payment card interchange network 28 receives the itinerary information, payment card interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card interchange network 28, and then between payment card interchange network 28 and merchant bank 26, and then between merchant bank 26 and merchant 24.

Figure 2:
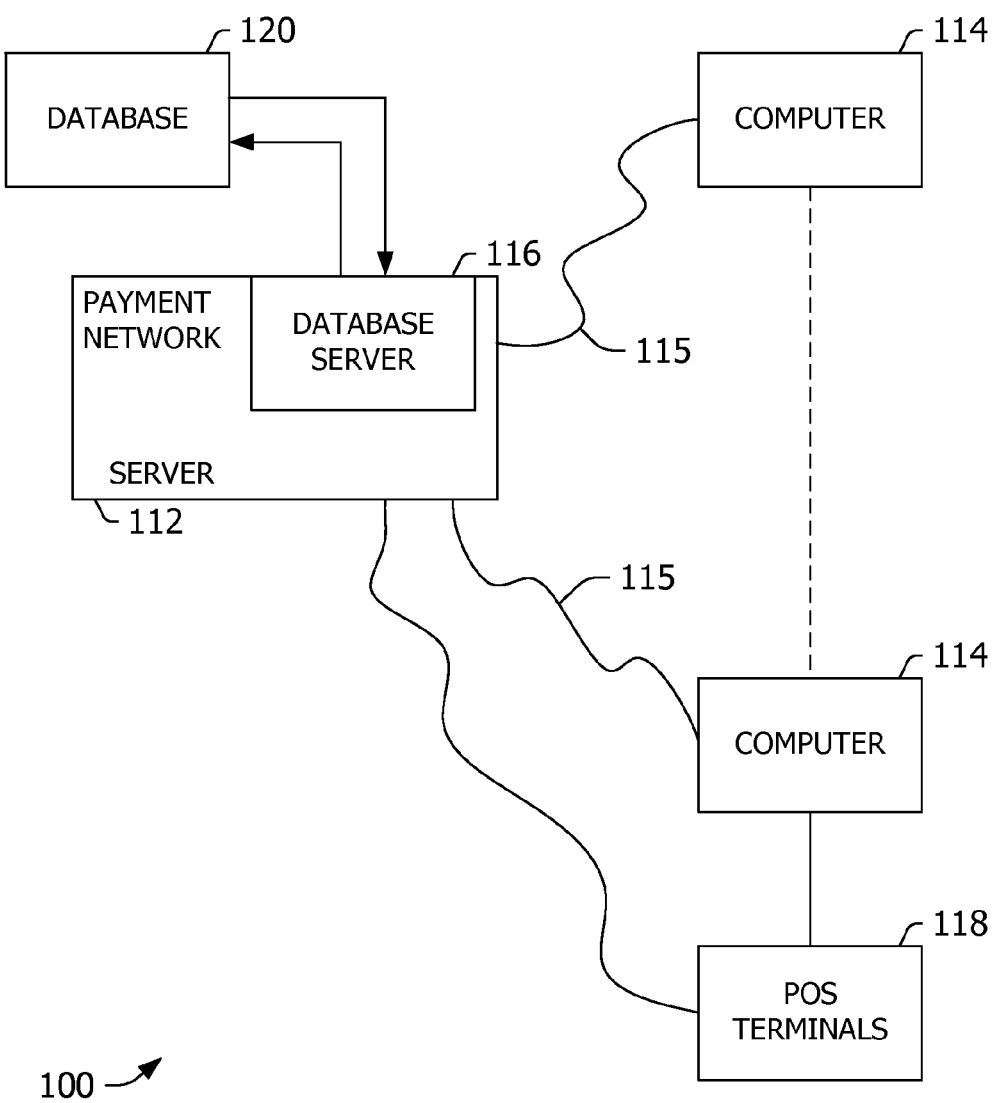

FIG. 2 is a simplified block diagram of an exemplary processing system 100 including a plurality of computer devices connected in communications using one or more NNI devices. In the example embodiment, system 100 may be used for performing payment-by-card transactions received as part of processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the exemplary embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card interchange network 28. In the exemplary embodiment, server system 112 is associated with a network interchange, such as payment card interchange network 28, and may be referred to as an interchange computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, and/or a biller.

Using payment card interchange network 28, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
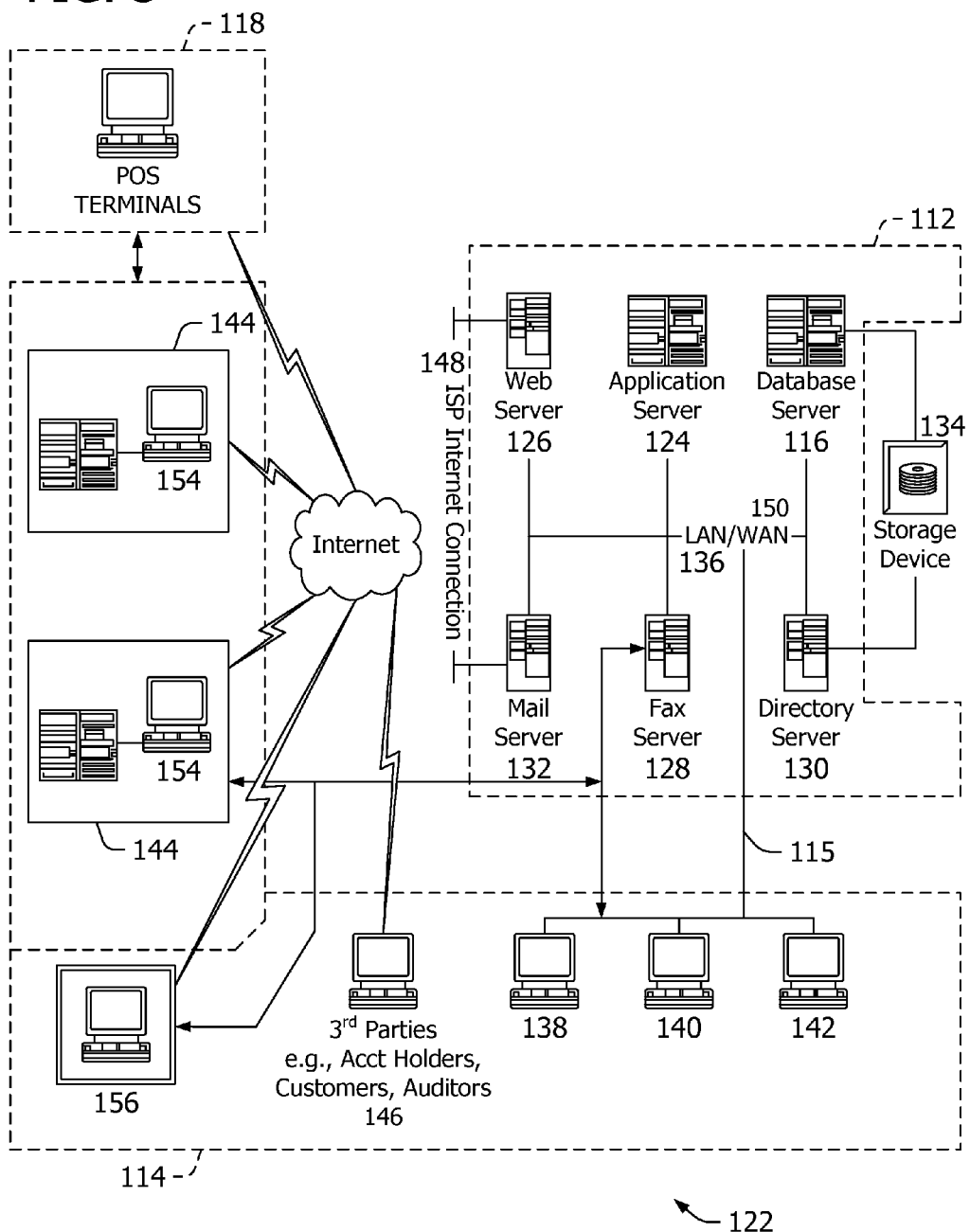

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Network connection 115 includes the RDT network, which allows the payment network associated with server system 112 to rapidly connect with acquirer bank 26 and/or issuer bank 30 (shown in FIG. 1) by initially deploying a satellite communication link between the payment network and acquirer bank 26 and/or issuer bank 30, and subsequently deploying a terrestrial communication link between the payment network and acquirer bank 26 and/or issuer bank 30. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
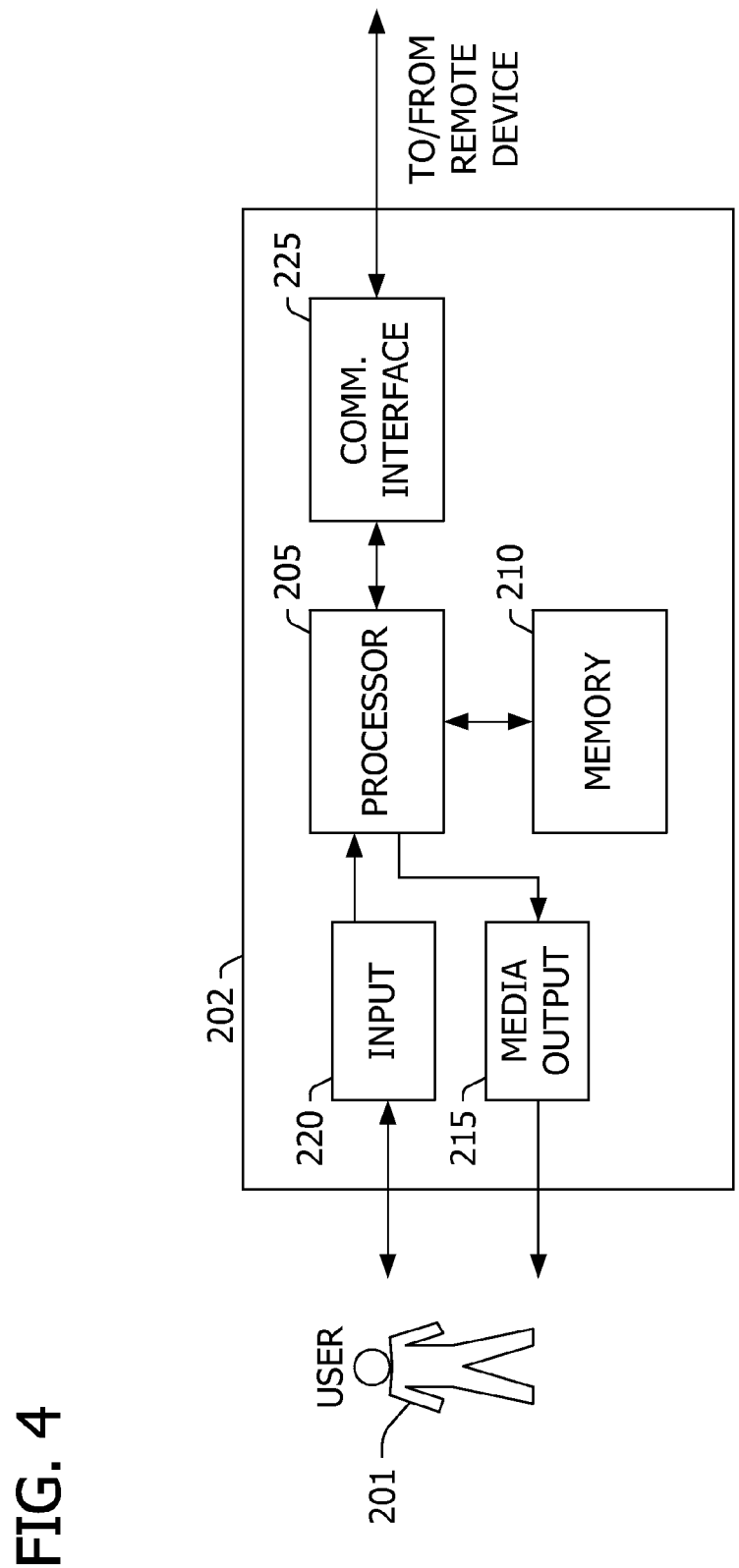

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
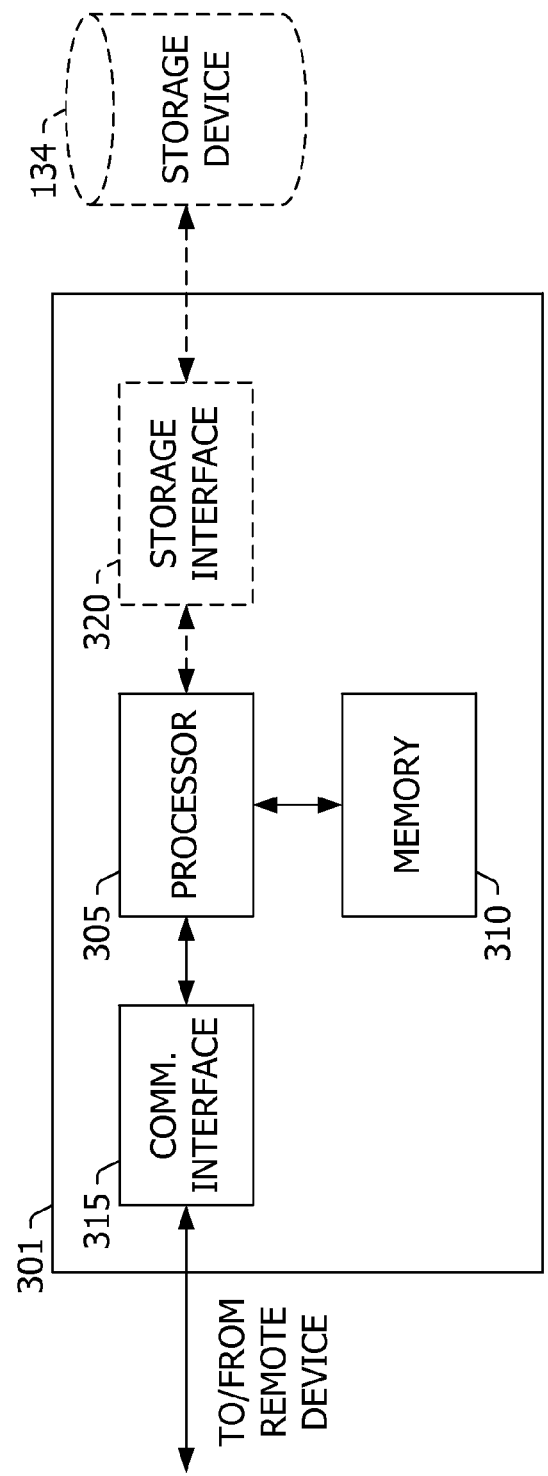

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
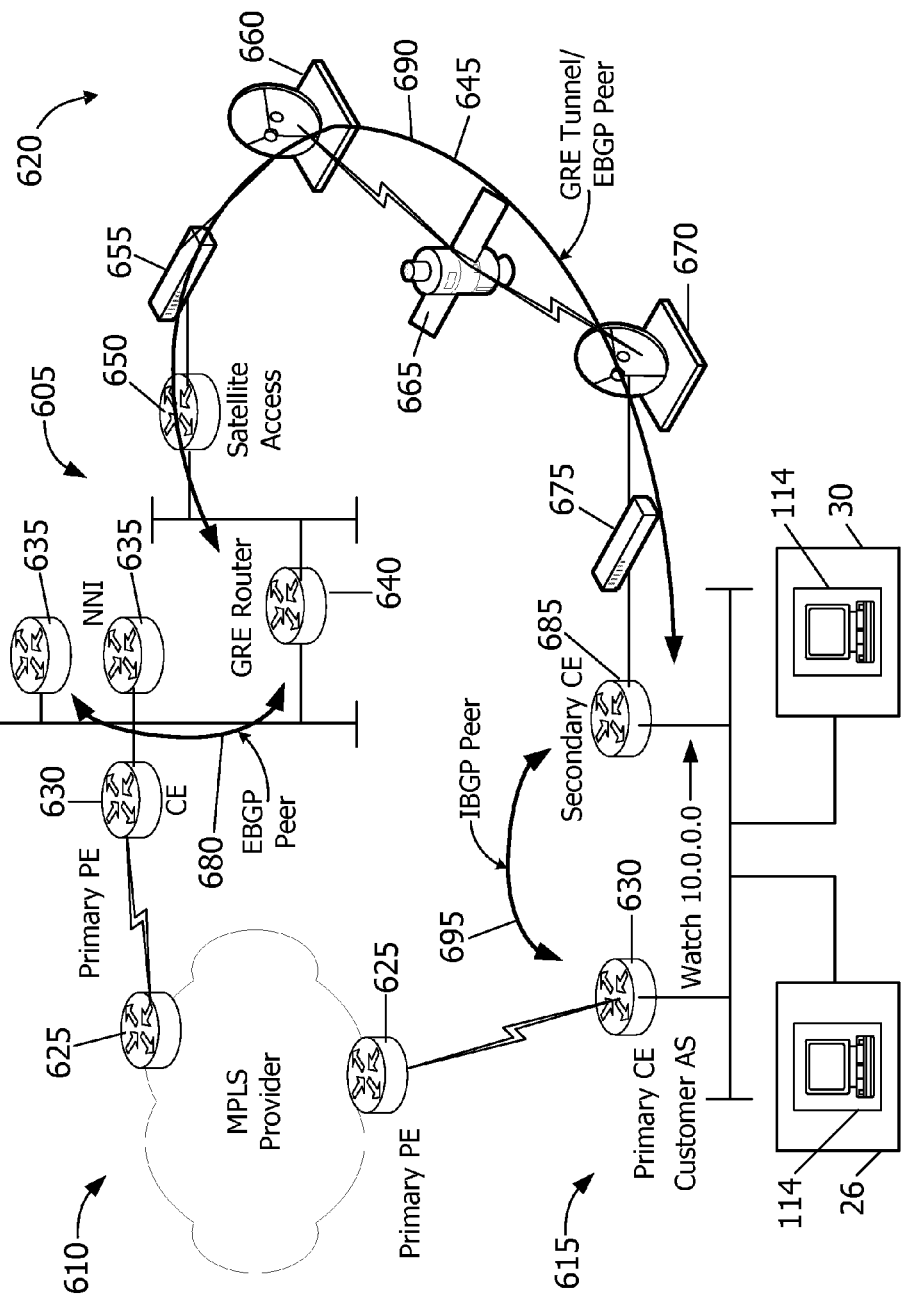

FIG. 6 is a schematic diagram of a communication network 600 that may be used with multi-party transaction card industry system 20 (shown in FIG. 1) or payment card interchange network 28. In the exemplary embodiment, network 600 includes a network to network interface (NNI) 605, one or more multiprotocol label switching (MPLS) networks 610, a customer network 615, and a satellite network 620. It should be appreciated that NNI 605 may link customer network 615 with satellite network 620 and/or MPLS network 610. In the exemplary embodiment, satellite network 620 is used when MPLS network 610 is unavailable. For example, satellite network 620 may be used before customer network 615 is connected to MPLS network 610. Alternatively, or additionally, satellite network 620 may be used as a secondary, or backup, link if customer network 615 is unable to reach NNI 605 via MPLS network 610. Satellite network 620 may also be used as a primary link between customer network 615 and NNI 605.

MPLS network 610 includes at least one provider edge (PE) router 625 that is connected to a corresponding customer edge (CE) router 630. NNI 605 may be linked to more than one MPLS network 610 and NNI 605 may be configured to route data traffic between or among the more than one MPLS network 610. More particularly, NNI 605 may include at least one CE router 630 for each connected MPLS network 610. NNI 605 may include at least one router 635 configured to forward data traffic from a first MPLS network, such as MPLS network 610, to a second MPLS network (not shown) via the corresponding CE router(s) 630. Alternatively, CE router 630 may be configured to forward traffic bound for a different MPLS network 610 to the corresponding CE router 630.

NNI 605 is linked to satellite network 620 via a router 640 that is capable of creating a GRE tunnel, such as GRE tunnel 645. Satellite network 620 may include a satellite network provider system 650, which may be a router, a first satellite modem 655, a first satellite dish 660 or transceiver, a satellite 665, a second satellite dish 670 or transceiver, and a second satellite modem 675. Alternatively, router 640 and system 650 may be a single device. When used as a primary link, satellite network 620 may provide a contention ratio of 1:1 for customer network 615. When used as a secondary link, satellite network 620 may provide a higher contention ratio, e.g. 1:5, 1:10, 1:20, 1:50, etc., for customer network 615.

GRE tunnel 645 is used to connect customer network 615 with NNI 605. In the exemplary embodiment, GRE tunnel 645 is created using satellite network 620. Alternatively, or additionally, GRE tunnel 645 may be created using any other network, such as the Internet. Border gateway protocol (BGP) may be used across GRE tunnel 645 for routing. BGP conditional advertising may be used to introduce customer network 615 if the primary link, i.e., MPLS network 610, is unusable. A BGP community string may be used to identify the networks passed over the secondary link, i.e., satellite network 620 or the Internet. A BGP autonomous system (AS) number may be prepended for identifying the secondary link as a learned route. Static routing may be used to connect NNI 605 with router 640 and/or satellite network 620. Satellite network 620 may provide a tunnel destination route, e.g., following RFC1918. In the exemplary embodiment, router 640 is capable of supporting policy maps, class maps, prefix lists, and an access control list (ACL) specific to satellite network 620.

External BGP (EBGP) peers 680 may be established between router 640 and router(s) 635 for passing customer network 615 as a secondary, or backup, connection. NNI 605 may advertise customer network 615 using BGP. To allow for a redundant path, BGP conditional advertisement may be used. A BGP peer route-map entry may be used to filter traffic such that only predetermined traffic is sent to GRE router 640. A BGP peer "distribute-list" may be used to limit the learned routes from GRE router 640. The distribute-list may deny all routes from GRE router 640. It should be appreciated that BGP timers may need to be set sufficiently high to allow for transmission delays associated with transmission via satellite network 620, e.g. several hundred milliseconds.

GRE tunnel 645 may connect to CE router 630 on customer network 615 or a second CE router 685 on customer network 615. EBGP peers 690 may be established at endpoints of GRE tunnel 645, e.g., router 640 and router 685, or router 640 and router 630 on customer network 615. Using BGP conditional advertising, customer network 615 may be advertised over GRE tunnel 645. A watched router for BGP conditional advertising may be in the 10.0.0.0/8 network. In the exemplary embodiment, GRE tunnel 645 endpoint on customer network 615, e.g. router 630 or router 685, is capable of supporting route maps, policy maps, class maps, prefix lists, and an ACL. Accordingly, quality of service (QoS) may be enforced over GRE tunnel 645. In customer networks 615 with second router 685, an internal BGP (IBGP) peer session 695 may be established between router 630 on customer network 615 and router 685 in order to pass the 10.0.0.0/8 watched network. A static route may be used for egress access that points to GRE tunnel 645. GRE keepalives may be used on GRE tunnel 645.

During operation, if a primary link, e.g., a link from customer network 615 to MPLS network 610, were to fail, data (e.g., application traffic) normally transmitted over router 630 will instead be transmitted via router 685. Data transmitted to router 685 will be encapsulated in GRE tunnel 645 between customer network 615 and NNI 605. In the exemplary embodiment, satellite modem 675 encrypts incoming data, i.e., GRE tunnel 645. Data in GRE tunnel 645 is transmitted via satellite dish 670 to satellite 665 for forwarding to satellite modem 655 via satellite dish 660. GRE tunnel 645 is decrypted, e.g., using modem 655 or system 650, before it is passed to router 640. Router 640 de-encapsulates GRE tunnel 645 and forwards the data from GRE tunnel 645 to router(s) 635 for forwarding to appropriate destinations, e.g., using MPLS network 610. On router 685, a statically-assigned default route, i.e., 0.0.0.0/0, may point to the IP address of GRE tunnel 645 at NNI 605. More particularly, when the link to MPLS network 610 fails, BGP will no longer see the watched 10.0.0.0 network and will trigger BGP to forward customer network 615 traffic to router 685. Router 685 may also forward the advertised customer network 615 to NNI 605 for forwarding, e.g., to CE router 630 within NNI 605. More particularly, customer network 615, GRE tunnel 645 interfaces, and router loopback addresses may be advertised. It should be appreciated that customer network 615 routes may be advertised only when the link between customer network 615 and MPLS network 610 fails.

Figure 7:
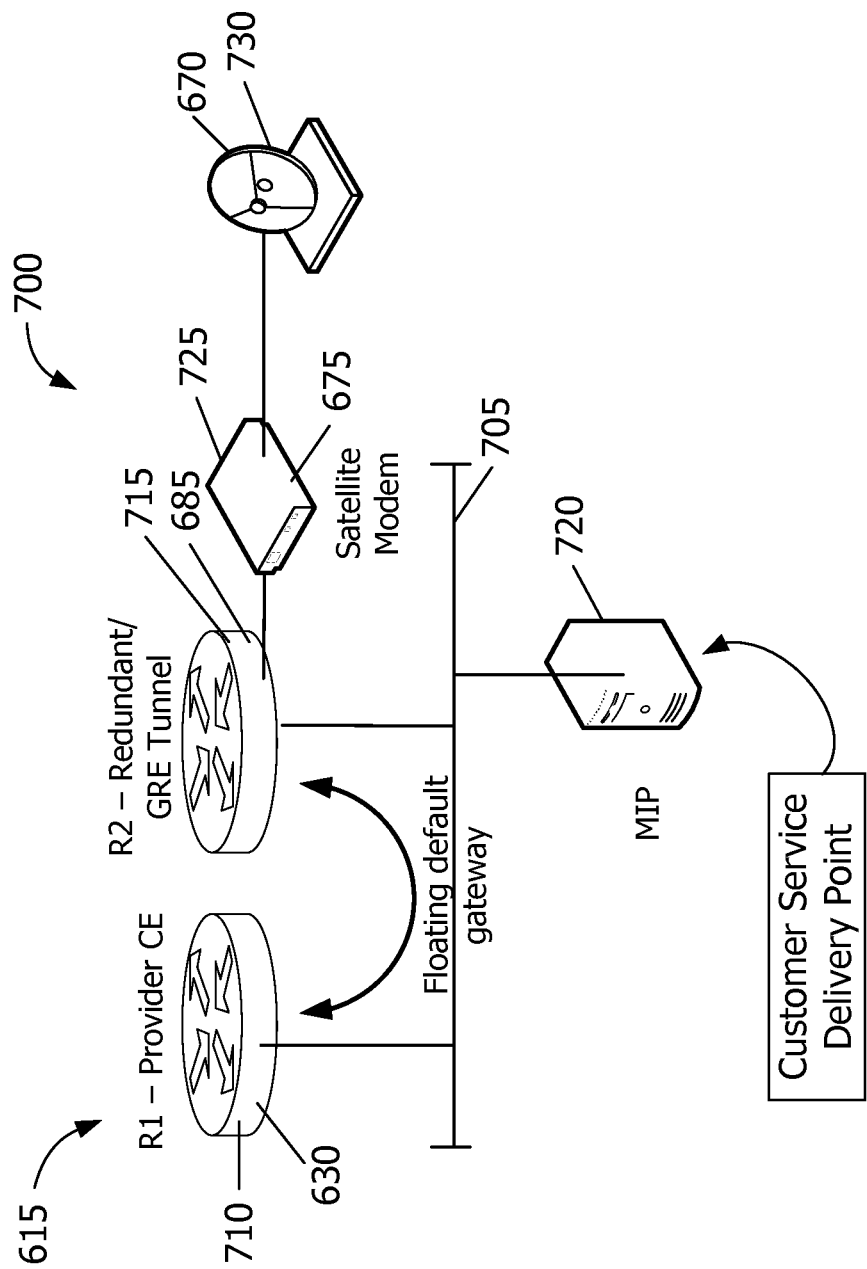
Figure 8:
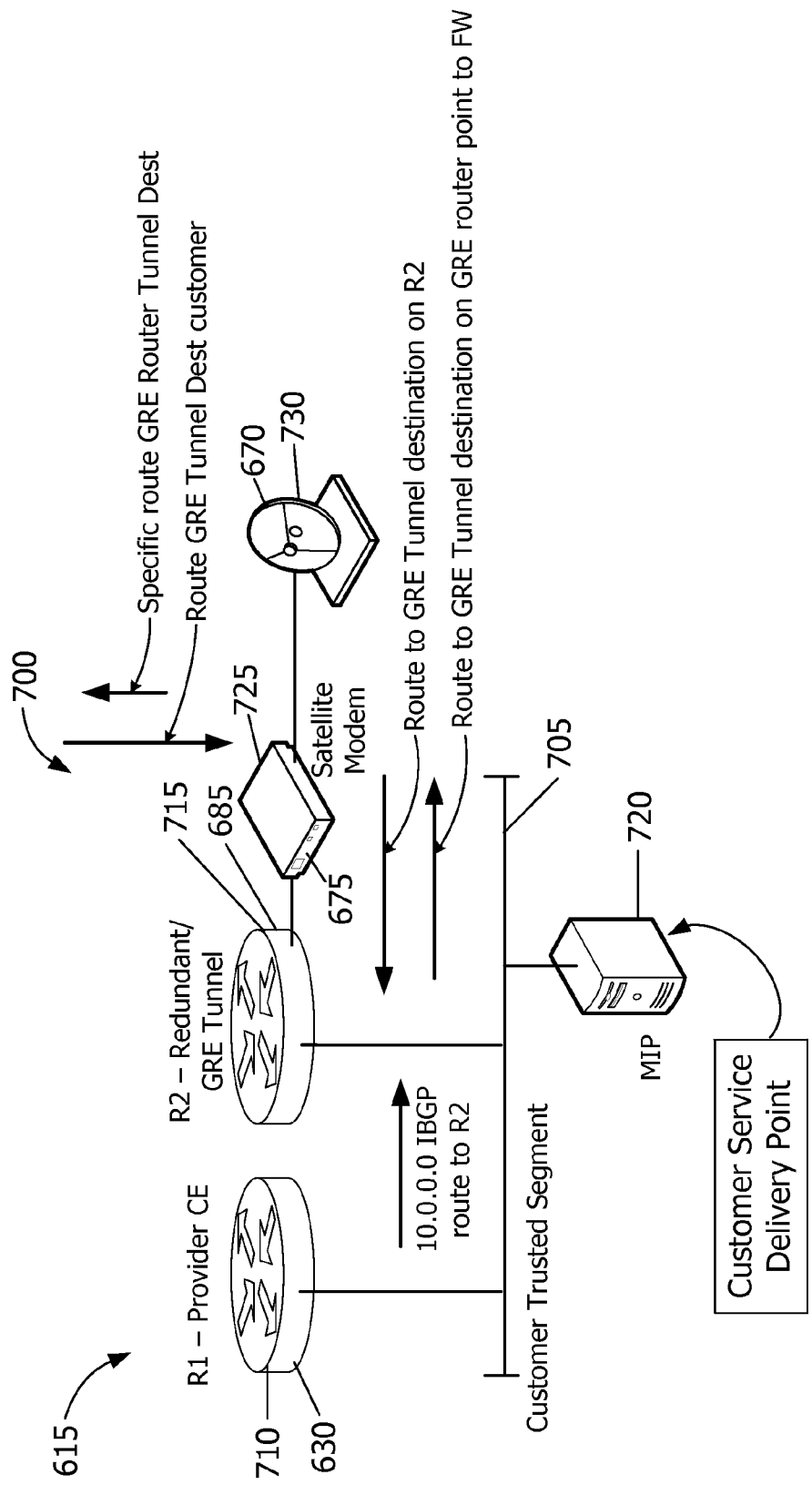

FIGS. 7 and 8 are schematic diagrams of an exemplary customer network 700. Customer network 615 includes a local area network (LAN) 705 that links a CE router 710, which may be the same as router 630, a GRE router 715, which may be the same as router 685, and a communications processor 720. In the exemplary embodiment, communications processor 720 is a MASTERCARD INTERFACE PROCESSOR™ or MIP™ (trademarks of MasterCard International, Inc., of Purchase, N.Y.). GRE router 685 is linked to a satellite modem 725, which may be the same as satellite modem 675. Satellite modem 725 is in communication with second satellite dish 730, which may be the same as second satellite dish 670. Processor 720 is configured to communicate with server system 112 of payment network 28 for processing payment transactions. Processor 720 may be located at and/or utilized by at least one of acquirer bank 26 and issuer bank 30 (shown in FIG. 6).

Figure 9:
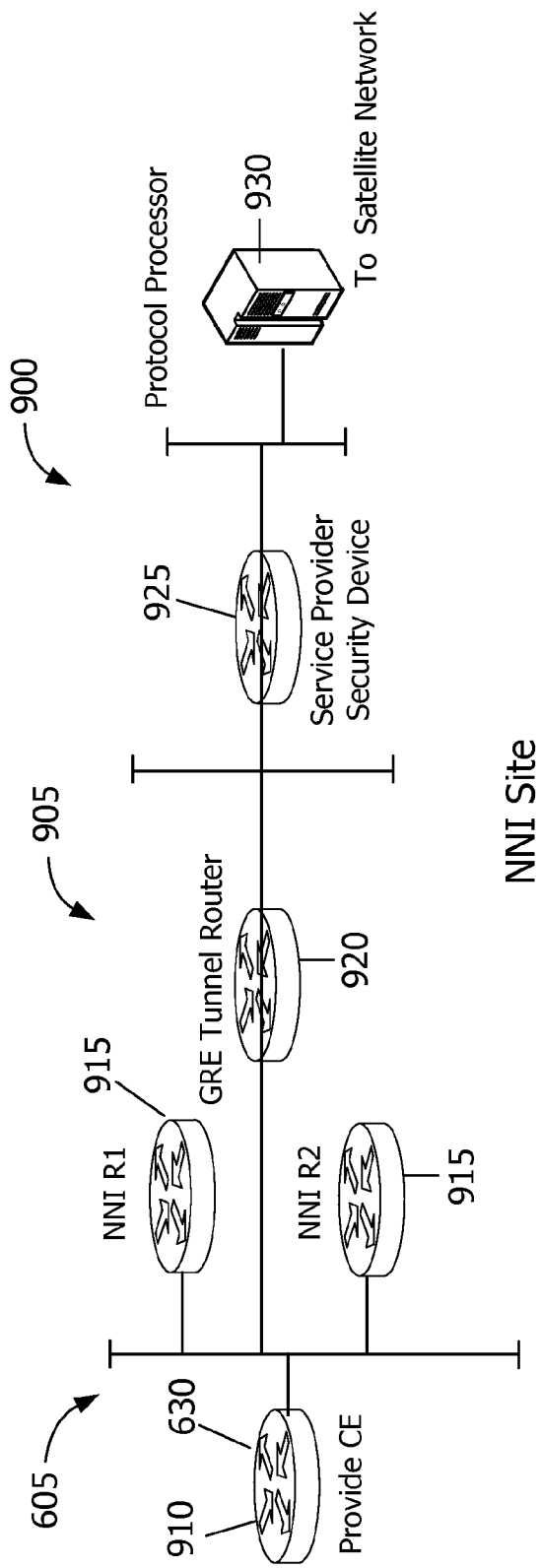
Figure 10:
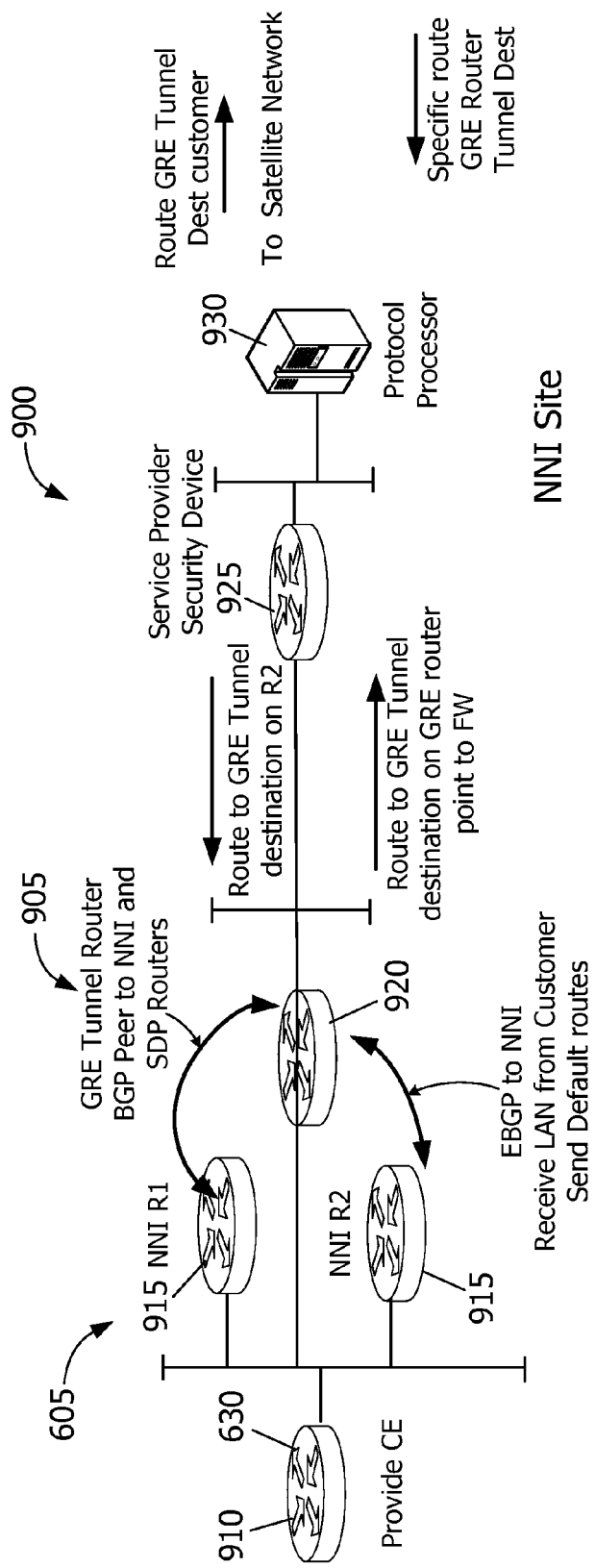

FIGS. 9 and 10 are schematic diagrams of an exemplary NNI 900, which may be the same as NNI 605. NNI 900 includes a LAN 905 that links a CE router 910, at least one router 915, and a GRE router 920. GRE router 920 is linked to a satellite provider security system 925 or router, which may be configured to encrypt or decrypt data transmitted over a satellite network (not shown). Security system 925 is linked to a protocol processor 930 that is linked to the satellite network (not shown). GRE router 920 may be linked to security system 925 via a layer 3 switch (not shown), which may be configured for level 2 access only. GRE router 920 may be linked to switches (not shown) within NNI 900 using at least one virtual LAN (VLAN).

Figure 11:
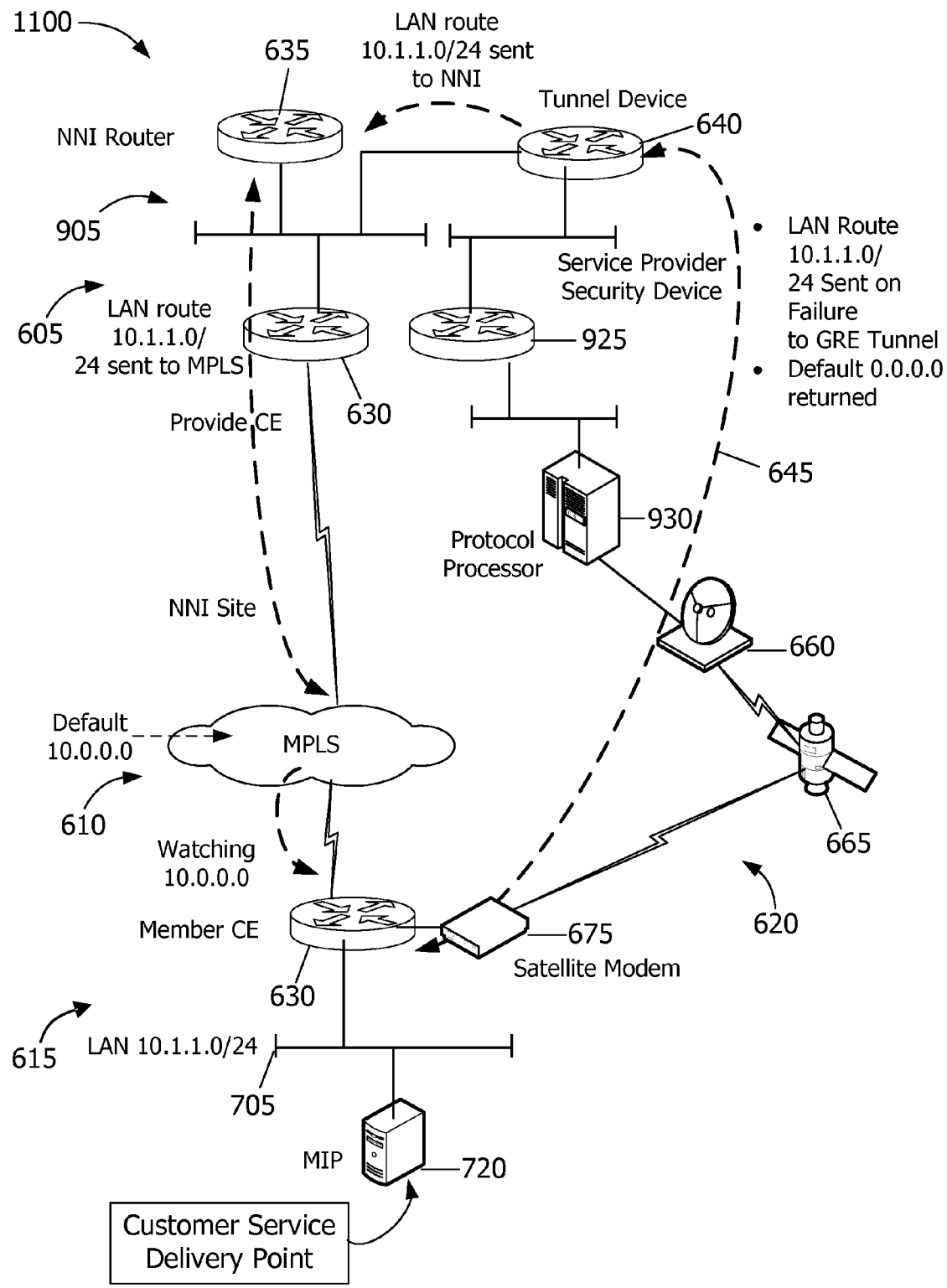

FIG. 11 is a schematic diagram of an example configuration 1100 of network 600. In this example, if the connection between CE router 630 on customer network 615 and MPLS network 610 fails, CE router 630 will "see" the lost route and, using BGP conditional advertisement, announce route(s) to customer network 615 to GRE tunnel 645 via satellite network 620. The route map may set the community value to a predetermined value, such as AS:222. The route map may also add a predetermined AS prepend value, such as 22222. GRE router 640 may forward customer network 615 routes to router(s) 635, and router(s) 635 may, in turn, forward customer network 615 routes to all CE routers 630 within NNI 605.

Existing VLANs may be used at NNI 605 for access between GRE router 640 and routers 635. A new VLAN may be used for access between security system 925, which may be a router, and GRE router 640. The link between security system 925 and GRE router 640 may use private addressing, i.e., from RFC1918. A loopback may be used as the source for GRE tunnel 645 interface. GRE tunnel 645 interface may use an address in the 10.0.0.0/8 network, and the GRE tunnel 645 source loopback address may be in the 192.168.0.0/16 network. The GRE tunnel 645 source used on customer network 615 may be allocated from blocks of /24 to permit summarization and simplify routing at NNI 605.

Hot standby router protocol (HSRP) may be used for failover between CE router 630 on customer network 615 and router 685. However, as shown in FIG. 11, a single router 630 may provide the same functionality as the combination of routers 630 and 685 (i.e., links customer network 615 to either/both MPLS network 610 and satellite network 620). Multiple LAN links to router 685, in the case of a dual router setup, or to router 630, in the case of a single router setup, provide redundancy for switch failure.

ACL is used in route maps as filters in BGP. ACL may define the watched route for a "non-exist" route-map (which may be defined on router 630), allow advertised routes, and deny routes from GRE router 640. The community string set on GRE tunnel 645 may be used in a BGP route-map to allow customer network 615 route to routers 635. A route-map for each MPLS network 610 may be required. For example, an outgoing BGP route-map may be used with an ACL to prevent sending any routes over GRE tunnel 645 except for predetermined conditional routes. The BGP statement may be as follows: neighbor 10.100.12.20 advertise-map adver_default non-exist-map watch_route. The non-exist-map is the watched route. The advertise-map is for sending customer network 615 routes if the primary link is down.

Encryption may be accomplished using DES, AES, or any suitable encryption algorithm using a suitable number of bits, e.g., 256. QoS may be configured on GRE tunnel 645. Accordingly, QoS marking of traffic may be required as data is sent to router 635. The following QoS configurations may be used:

Egress LAN Interface to customer network
service-policy output COUNT-OUT
Egress LAN Interface to satellite modem
service-policy input COUNT-IN
class-map match-any DSCP-OUT-D3
match ip dscp af11
match ip dscp af12
class-map match-all DSCP-COUNT-D3OOP
match ip dscp af12
class-map match-all DSCP-COUNT-D2OOP
match ip dscp af22
class-map match-all DSCP-COUNT-D1OOP
match ip dscp af32
class-map match-all DSCP-COUNT-D1INP
match ip dscp af31
class-map match-all DSCP-COUNT-D2INP
match ip dscp cs2 af21
class-map match-all DSCP-COUNT-D3INP
match ip dscp af11
policy-map COUNT-OUT
class DSCP-COUNT-D1INP
set ip dscp af31
class DSCP-COUNT-D1OOP

```
set ip dscp af32
class DSCP-COUNT-D2INP
set ip dscp af21
class DSCP-COUNT-D3INP
set ip dscp default
class ROUTING-COUNT
set ip dscp cs6
class SCAVENGER-COUNT
set ip dscp cs1
policy-map COUNT-IN
class DSCP-COUNT-D1INP
set ip dscp af31
class DSCP-COUNT-D1OOP
set ip dscp af32
class DSCP-COUNT-D2INP
set ip dscp af21
class DSCP-COUNT-D3INP
set ip dscp af11
class ROUTING-COUNT
set ip dscp cs6
class SCAVENGER-COUNT
set ip dscp cs1
```

Figure 12:
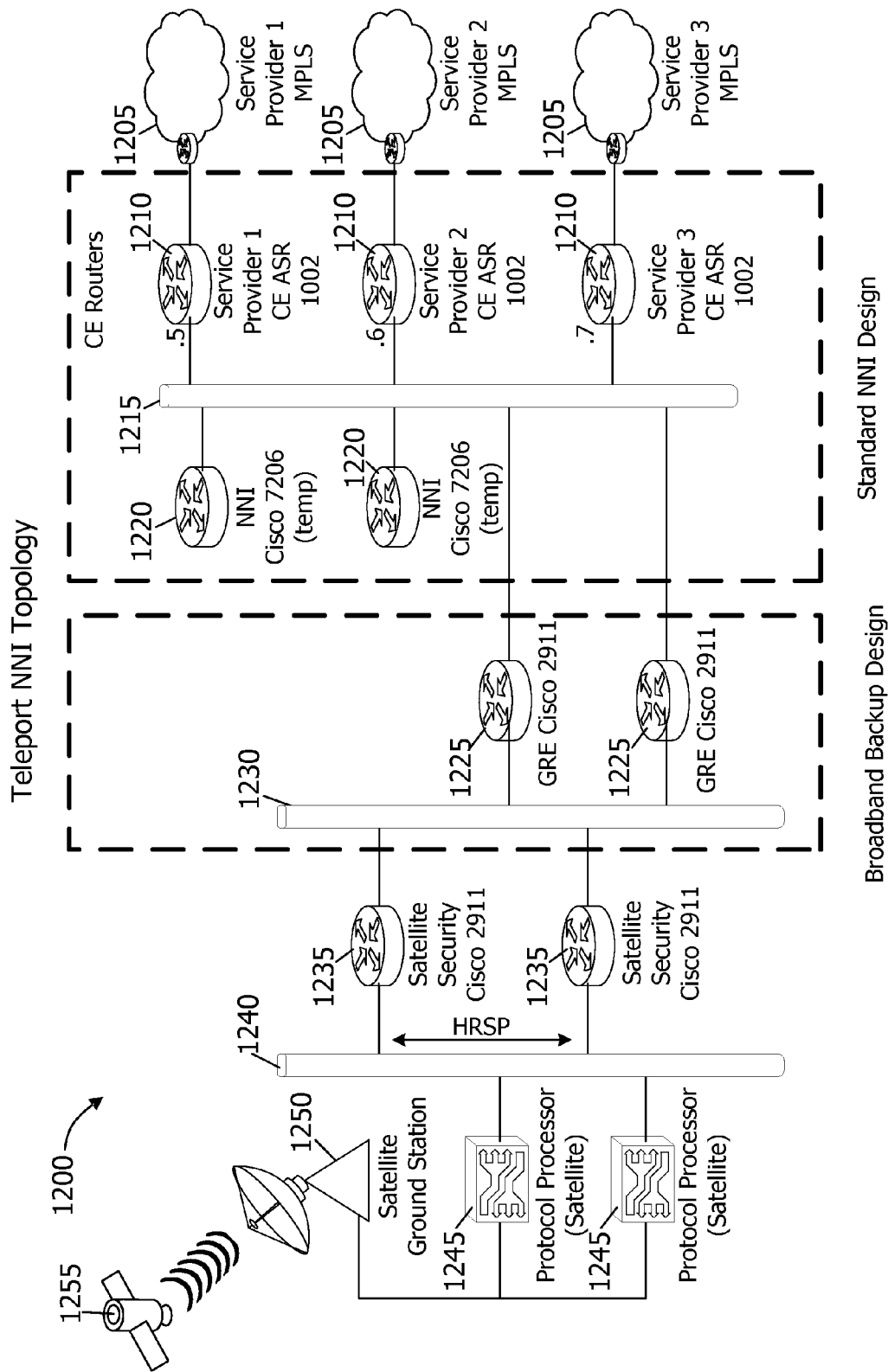

FIG. 12 is an exemplary NNI 1200 that may be used with network 600. NNI 1200 may be linked to one or more MPLS networks 1205 via one or more CE routers 1210. A LAN 1215 may link CE routers 1210, at least one router 1220, and at least one GRE router 1225. A LAN 1230 may link GRE routers 1225 to satellite routers 1235. HRSP may be used on a LAN 1240 to provide failover between or among satellite routers 1235. LAN 1240 may link satellite routers 1235 with one or more protocol processors 1245. Protocol processors 1245 are configured to send and receive data to/from a satellite ground station 1250 and to/from LAN 1240 and/or routers 1235. Satellite ground station 1250 is configured to communicate with satellite 1255. While a specific number of routers, LANs, MPLS networks, and other components are shown in FIG. 12, it is contemplated that any number of such components may be used in accordance with the present invention.

Routers 1220 may be configured to forward traffic from any CE router 1210 to any other CE router 1210. In other words, NNI 1200 is capable of effectively bridging more than one MPLS network. NNI 1200 may also be capable of forwarding traffic from any GRE router 1225 to any MPLS network 1205, and vice versa. It should be appreciated that any endpoint or system within NNI 1200 may be configured to communicate with any other endpoint or system within NNI 1200.

Alternatively, NNI 1200 may be configured to communicate with customer networks via the Internet. For example, rather than linking GRE routers 1225 and/or LAN 1230 to satellite routers 1235, GRE routers 1225 and/or LAN 1230 may be linked to Internet routers (not shown) that are configured to communicate with the Internet. Accordingly, GRE routers 1225 may create GRE tunnels (not shown) with customer networks via the Internet using the same principles described herein.

Figure 13:
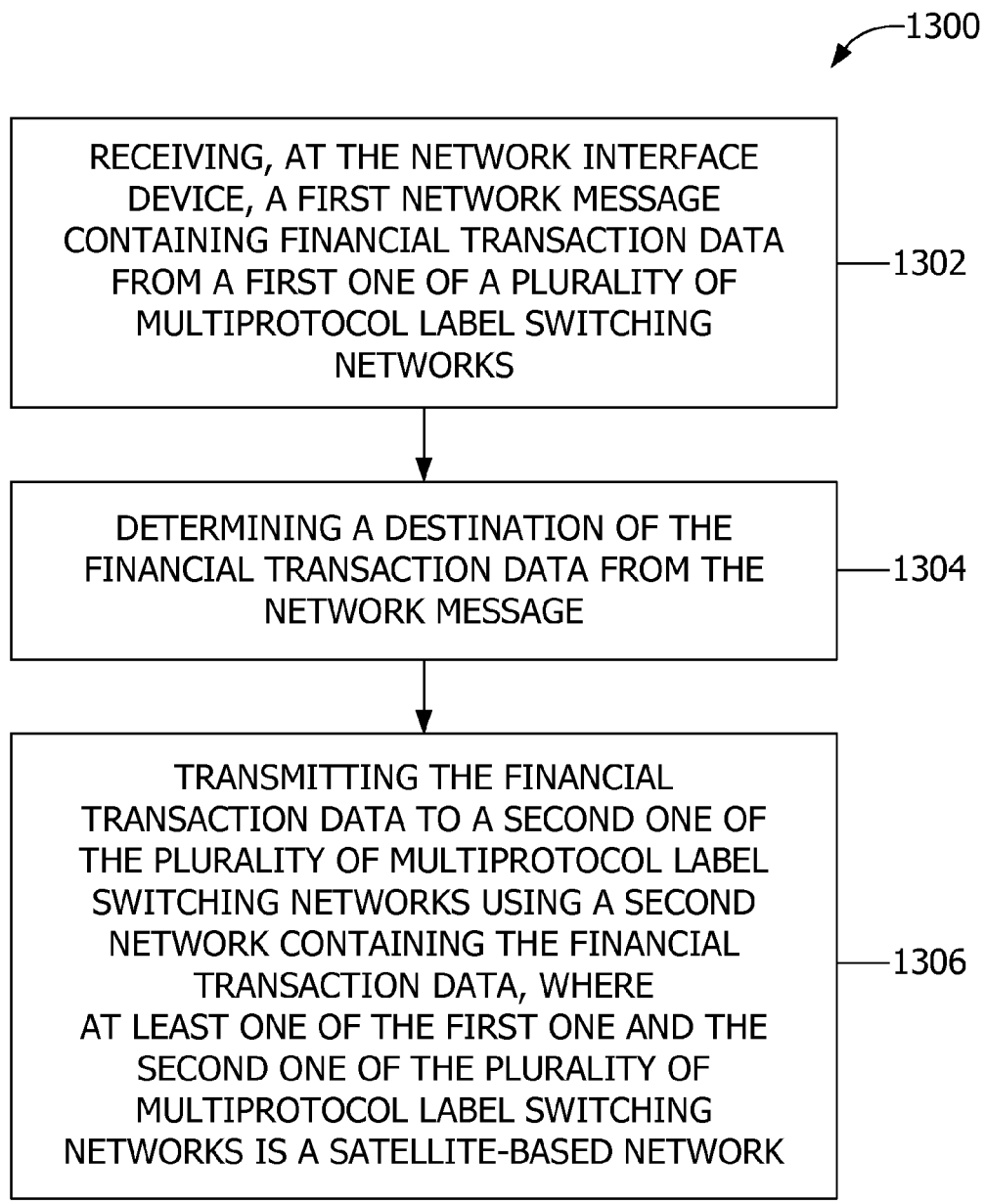

FIG. 13 is a flow diagram of a computer-based method 1300 for providing a payment network via a plurality of multiprotocol label switching networks wherein the method is implemented using a network interface device including a processor coupled to a memory device. In the exemplary embodiment, the method includes receiving 1302, at the network interface device, a first network message containing financial transaction data from a first one of a plurality of multiprotocol label switching networks. Method 1300 also includes determining 1304 a destination of the financial transaction data from the network message and transmitting 1306 the financial transaction data to a second one of the plurality of multiprotocol label switching networks using a second network containing the financial transaction data, where at least one of the first one and the second one of the plurality of multiprotocol label switching networks is a satellite-based network.

Figure 14:
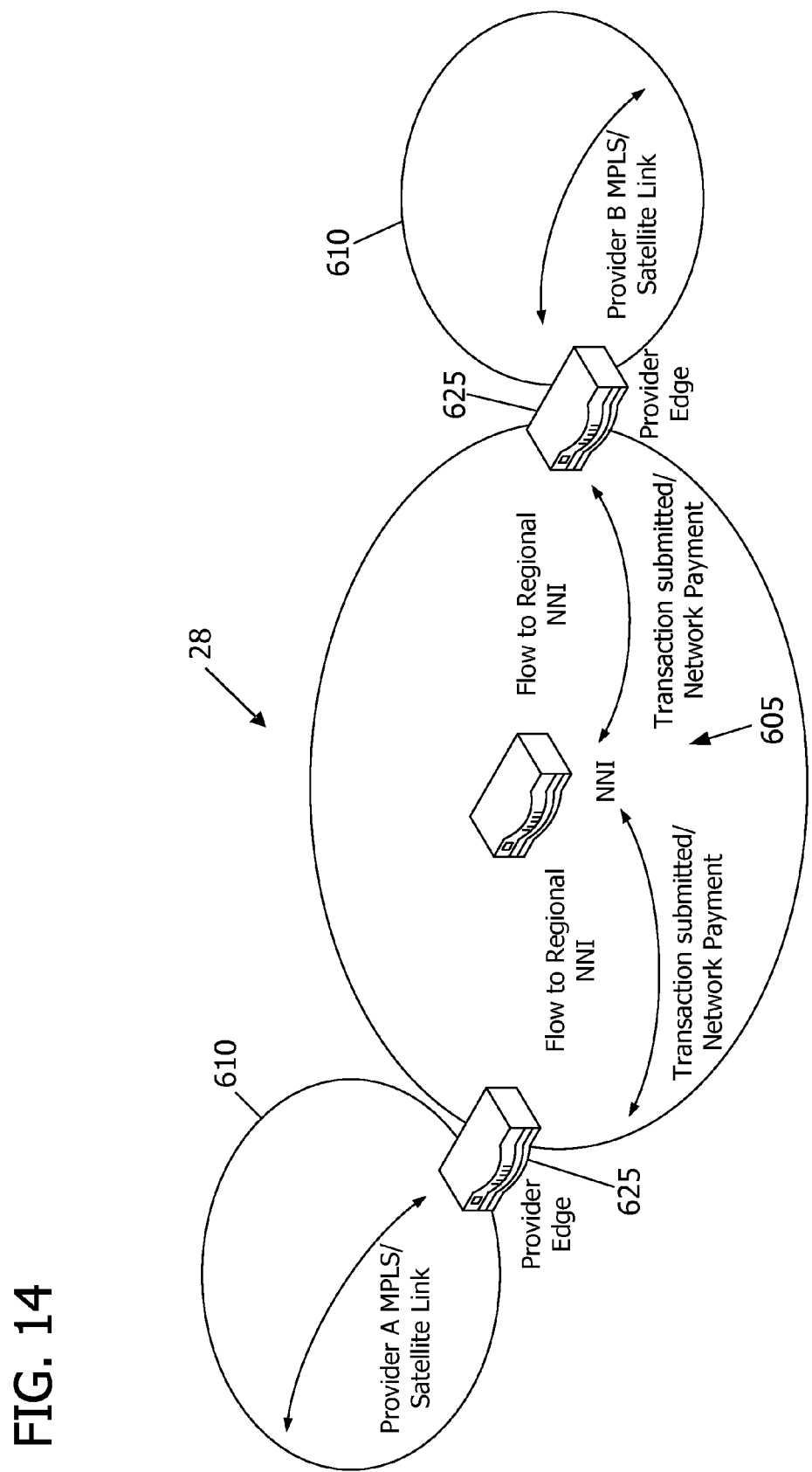

FIG. 14 is an expanded schematic block diagram of payment card interchange network 28 (shown in FIG. 1) in accordance with an exemplary embodiment of the present disclosure. In the exemplary embodiment, payment card interchange network 28 includes network to network interface (NNI) 605, which is implemented to facilitate providing an interface between MPLS networks, providing regional summary to drive local transactions to regional NNIs to reduce latency for real-time transactions, provide customers with redundant access connected to regional NNIs to also reduce latency for real-time transactions, determining application type and setting QoS for the provider MPLS networks, and verifying ownership of the transaction or network packet.

During operation, a merchant requests transaction authorization using communications through MPLS 610 provided by one of provider A or B or a satellite link. Payment card interchange network 28 processes the authorization request and replies with a payment authorization through MPLS 610 provided by another one of provider A or B or a satellite link.

The term customer, as used herein, may refer to merchant 24, merchant bank 26, issuer 30, and/or any party that needs to be connected to the payment card interchange network 28 through a communications processor, such as a MIP. Without limiting the generality of the foregoing, it is contemplated that the typical customer will be merchant bank 26 also referred to as the acquirer bank. The phrase "member SDP", or simply "SDP", refers to a "service delivery point" and may be used interchangeably with "customer network unit."

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is determining a storage location, determining a stock count, receiving a request for a customer network unit, processing the request, generating and transmitting a request for deployment of the customer unit, and adjusting the stock count in the storage location. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of expanding a network provide a cost-effective and reliable means for deploying customer network units for use with a satellite link. As a result, the methods and systems described herein facilitate rapid connection of customers to existing networks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A multiple network bridge system comprising:
   a first network device that is coupled to a first service provider network;
   a second network device that is coupled to a second service provider network, the second network comprising a multiprotocol label switching network, each of said first network device and said second network device configured to monitor communications between the first service provider network and the second service provider network for Quality of Service (QoS);
   a third network device that facilitates communication between the first network and the second network; and
   a fourth network device that is coupled to a satellite network, the satellite network providing a sole path of communication between a payment card interchange network and at least one of a merchant bank and an issuer bank during a first time period, the satellite network providing a backup path of communication between the payment card interchange network and the at least one of the merchant bank and the issuer bank during a second later time period, wherein the fourth network device is communicatively coupled to said third network device such that said fourth network device is capable of communicating with said first and second network devices.

2. The system of claim 1, wherein the multiple network bridge system is communicatively coupled to a payment card interchange network located remotely from the multiple network bridge system.

3. The system of claim 1, wherein the multiple network bridge system is communicatively coupled to a payment card interchange network located on a different geographical continent than the multiple network bridge system.

4. The system of claim 1, wherein said first and second network devices are located in a first geographical region and a communication message between said first and second network devices remains in the first geographical region.

5. The system of claim 1, wherein said first and second network devices are located in a second geographical region within a first geographical region and a communication message between said first and second network devices remains in the second geographical region.

6. The system of claim 5, wherein said first and second network devices are located in a third geographical region within the second geographical region and a communication message between said first and second network devices remains in the third geographical region.

7. The system of claim 1, wherein said first network comprises a multiprotocol label switching network.

8. The system of claim 1 wherein the satellite network is redundant of said first service provider network and said second service provider network during the second time period.

9. A computer-based method for providing a payment network via a plurality of multiprotocol label switching networks, the method implemented using a network interface device including a processor coupled to a memory device, the method comprising:
   receiving, at the network interface device, a first network message containing financial transaction data from a first one of a plurality of multiprotocol label switching networks;
   determining a destination of the financial transaction data from the network message;
   setting one or more Quality of Service (QoS) settings that permit intelligent routing of communications through the plurality of multiprotocol label switching networks between network endpoints;
   transmitting the financial transaction data to a second one of the plurality of multiprotocol label switching networks using a second network containing the financial transaction data the second network selected based on the QoS settings, where
   at least one of the first one and the second one of the plurality of multiprotocol label switching networks is a satellite-based network.

10. The computer-based method of claim 9, wherein transmitting the financial transaction data comprises transmitting the financial transaction data to a second one of the plurality of multiprotocol label switching networks that is in the same geographic region as the first one of a plurality of multiprotocol label switching networks.

11. The computer-based method of claim 9, wherein transmitting the financial transaction data comprises transmitting the financial transaction data in a communication message between the first and second one of the plurality of multiprotocol label switching networks such that the communication message remains in the same geographic region.

12. The computer-based method of claim 9, wherein transmitting the financial transaction data comprises transmitting the financial transaction data to a second one of the plurality of multiprotocol label switching networks that is in the same country as the first one of a plurality of multiprotocol label switching networks.

13. The computer-based method of claim 9, wherein transmitting the financial transaction data comprises transmitting the financial transaction data to a second one of the plurality of multiprotocol label switching networks that is in the same metropolitan area as the first one of a plurality of multiprotocol label switching networks.

14. The computer-based method of claim 9, wherein at least one of the plurality of multiprotocol label switching networks is an always-up satellite-based network.

15. One or more non-transitory computer-readable storage media having computer-executable instructions embodied thereon, wherein when executed by at least one processor, the computer-executable instructions cause the processor to:
   receive a first network message containing financial transaction data from a first one of a plurality of multiprotocol label switching networks;
   determine a destination of the financial transaction data from the network message;

set one or more Quality of Service (QoS) settings that permit intelligent routing of communications through the plurality of multiprotocol label switching networks between network endpoints;

transmit the financial transaction data to a second one of the plurality of multiprotocol label switching networks using a second network containing the financial transaction data the second network selected based on the QoS settings, where at least one of the first one and the second one of the plurality of multiprotocol label switching networks is a satellite-based network.

16. The computer-readable storage media of claim 15, wherein the computer-executable instructions further cause the processor to monitor communications between the first service provider network and the second service provider network for Quality of Service (QoS).

17. The computer-readable storage media of claim 15, wherein the computer-executable instructions further cause the processor to set Quality of Service (QoS) settings that permit intelligent routing of communications through multiprotocol label switching networks between network endpoints.

18. The computer-readable storage media of claim 15, wherein the computer-executable instructions further cause the processor to transmit the financial transaction data to a second one of the plurality of multiprotocol label switching networks that is in the same geographic region as the first one of a plurality of multiprotocol label switching networks.

* * * * *